US012555558B2

(12) United States Patent
Boulvert et al.

(10) Patent No.: US 12,555,558 B2
(45) Date of Patent: Feb. 17, 2026

(54) ACOUSTIC TREATMENT COATING COMPRISING A FOLDED ORDERED METAPOROUS MATERIAL

(71) Applicants: SAFRAN AIRCRAFT ENGINES, Paris (FR); CENTRE NATIONAL DE LA RECHERCHE SCIENTIFIQUE, Paris (FR); UNIVERSITE DU MANS, Le Mans (FR)

(72) Inventors: Jean Boulvert, Moissy-Cramayel (FR); Théo Cavalieri, Moissy-Cramayel (FR); Jean-Philippe Groby, Le Mans (FR); Annie Ross, St-Lazare (CA); Edith Roland Fotsing, Mascouche (CA); Jacky Novi Mardjono, Moissy-Cramayel (FR); Vicente Romero Garcia, Le Mans (FR); Gwénaël Gabard, Le Mans (FR); Josué Costa Baptista, Montréal (CA)

(73) Assignees: SAFRAN AIRCRAFT ENGINES, Paris (FR); CENTRE NATIONAL DE LA RECHERCHE SCIENTIFIQUE, Paris (FR); UNIVERSITE DU MANS, Le Mans (FR)

( * ) Notice: Subject to any disclaimer, the term of this patent is extended or adjusted under 35 U.S.C. 154(b) by 255 days.

(21) Appl. No.: 18/252,808

(22) PCT Filed: Nov. 9, 2021

(86) PCT No.: PCT/FR2021/051986
§ 371 (c)(1),
(2) Date: May 12, 2023

(87) PCT Pub. No.: WO2022/101579
PCT Pub. Date: May 19, 2022

(65) Prior Publication Data
US 2023/0419937 A1 Dec. 28, 2023

(30) Foreign Application Priority Data

Nov. 13, 2020 (CA) .................................. CA 3099284

(51) Int. Cl.
*G10K 11/162* (2006.01)

(52) U.S. Cl.
CPC .................................. *G10K 11/162* (2013.01)

(58) Field of Classification Search
CPC .................................................... G10K 11/162
See application file for complete search history.

(56) References Cited

U.S. PATENT DOCUMENTS

| 11,568,845 | B1* | 1/2023 | Manimala | G10K 11/172 |
| 2012/0161577 | A1* | 6/2012 | Abbott | H03H 9/02724 |
| | | | | 310/313 C |
| 2020/0143784 | A1* | 5/2020 | Huang | G10K 11/04 |

FOREIGN PATENT DOCUMENTS

| CN | 106448650 A | 2/2017 |
| CN | 107863096 A | 3/2018 |

(Continued)

OTHER PUBLICATIONS

International Search Report as issued in International Patent Application No. PCT/FR2021/051986, dated Mar. 16, 2022.

*Primary Examiner* — Forrest M Phillips
(74) *Attorney, Agent, or Firm* — Pillsbury Winthrop Shaw Pittman LLP

(57) ABSTRACT

An acoustic treatment coating includes a metamaterial, wherein the metamaterial includes a solid structure including at least one free space forming a folded cavity and at least one porous material placed in the free space of the solid structure.

9 Claims, 4 Drawing Sheets

(56) References Cited

FOREIGN PATENT DOCUMENTS

| | | | | |
|---|---|---|---|---|
| JP | 2002182654 | A | * | 6/2002 |
| KR | 20170112449 | A | * | 10/2017 |
| KR | 10-1887740 | B1 | | 8/2018 |
| WO | WO 2019/110940 | A1 | | 6/2019 |

* cited by examiner

[Fig. 1]
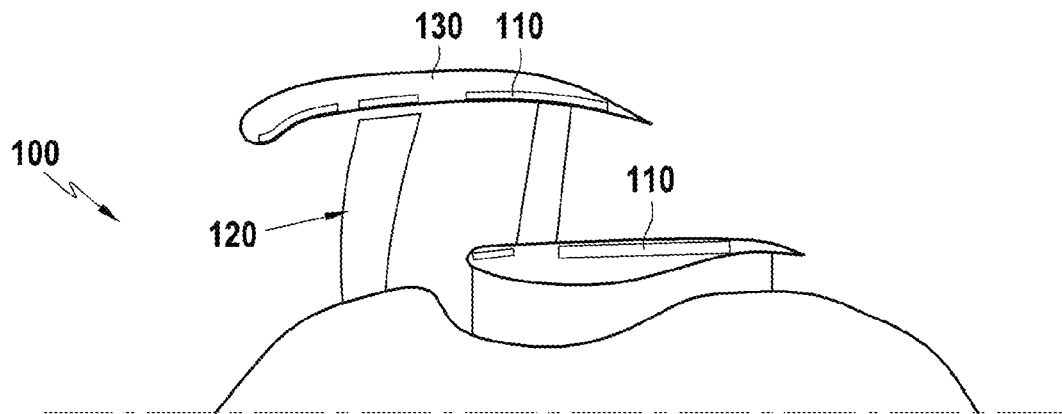
[Fig. 2A] [Fig. 2B] [Fig. 2C]
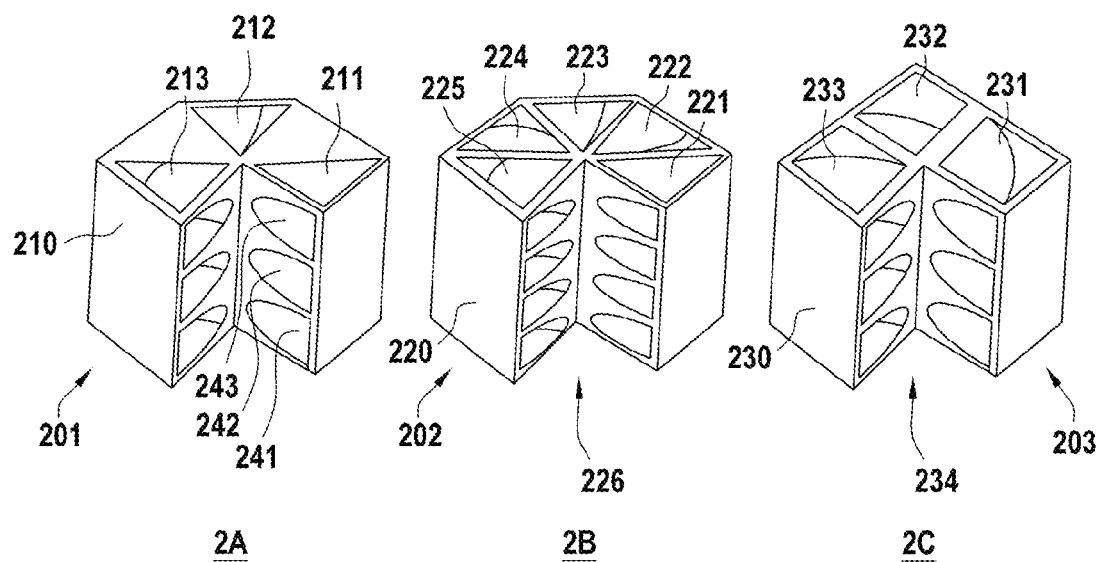
2A  2B  2C

[Fig. 3]
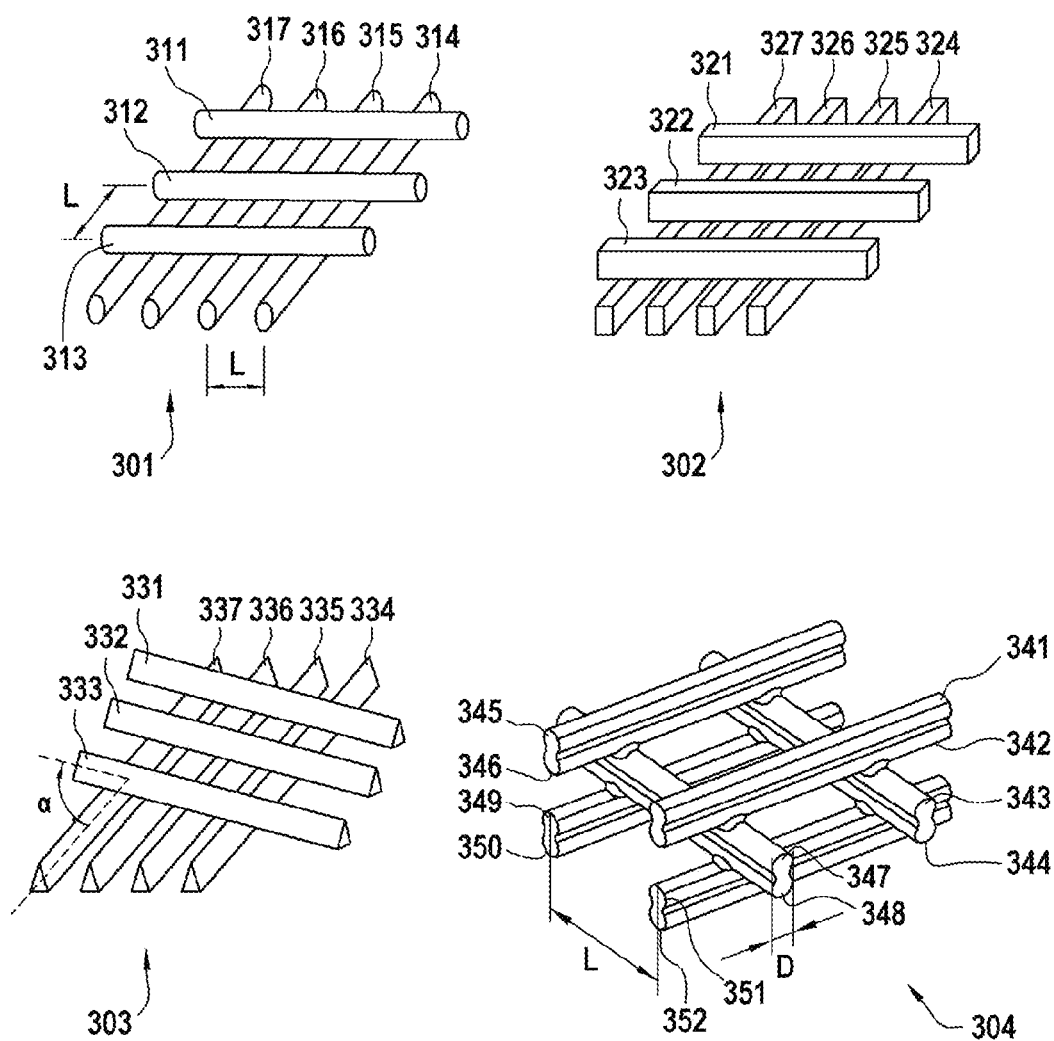

[Fig. 4]
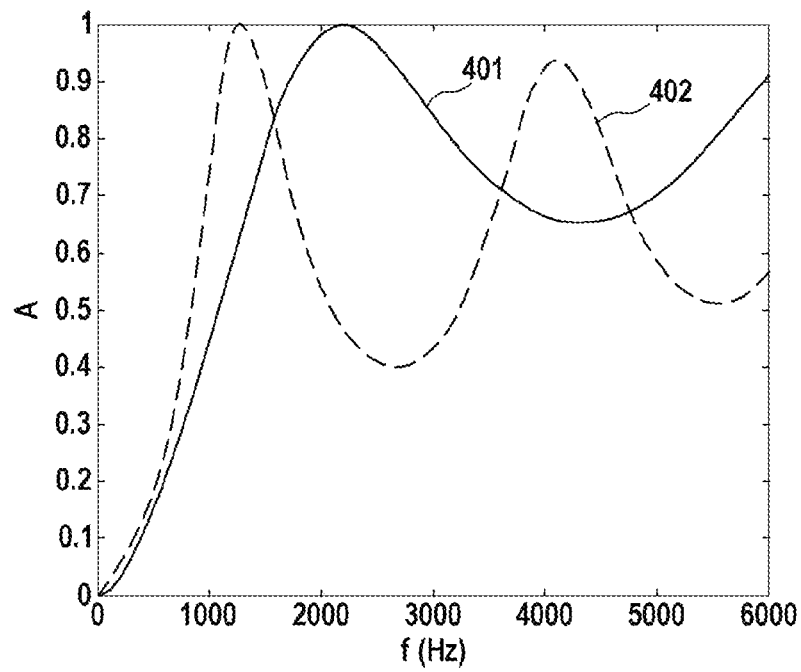
[Fig. 5]
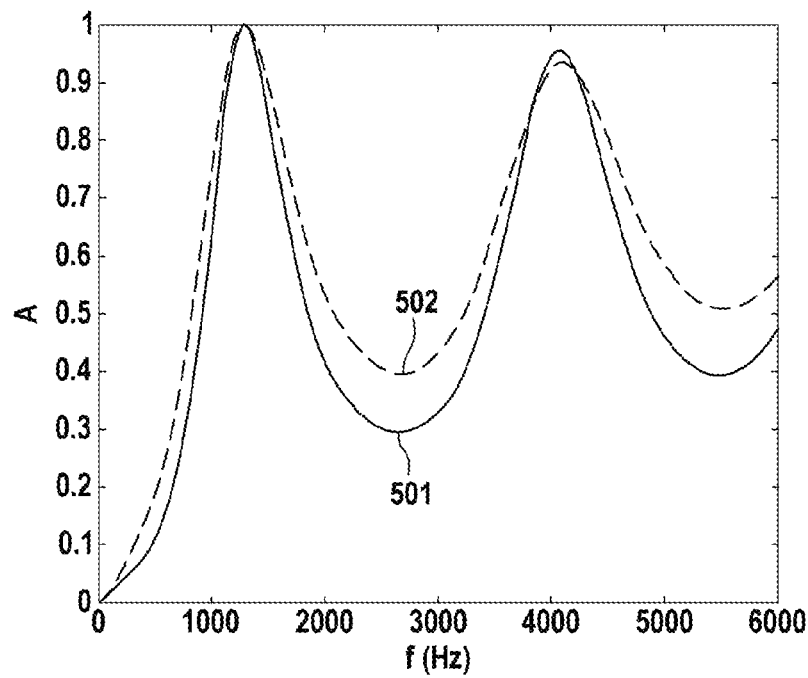

[Fig. 6]
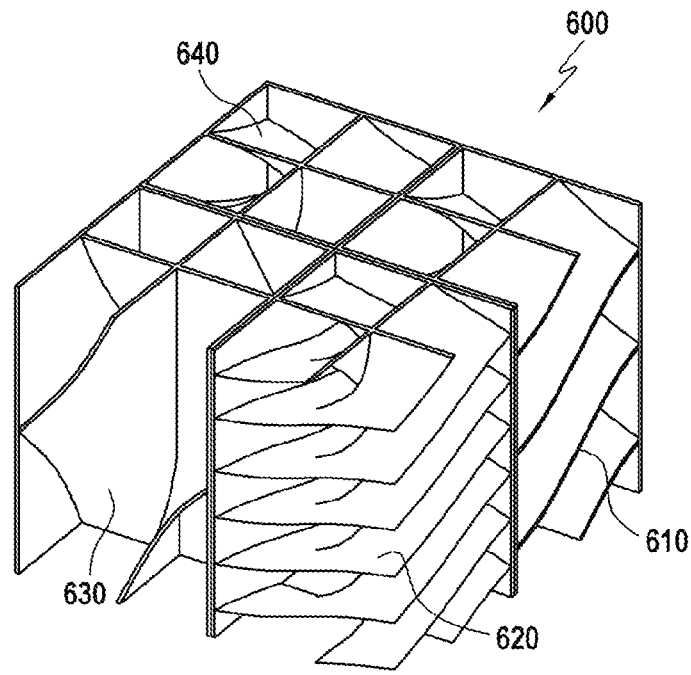
6A
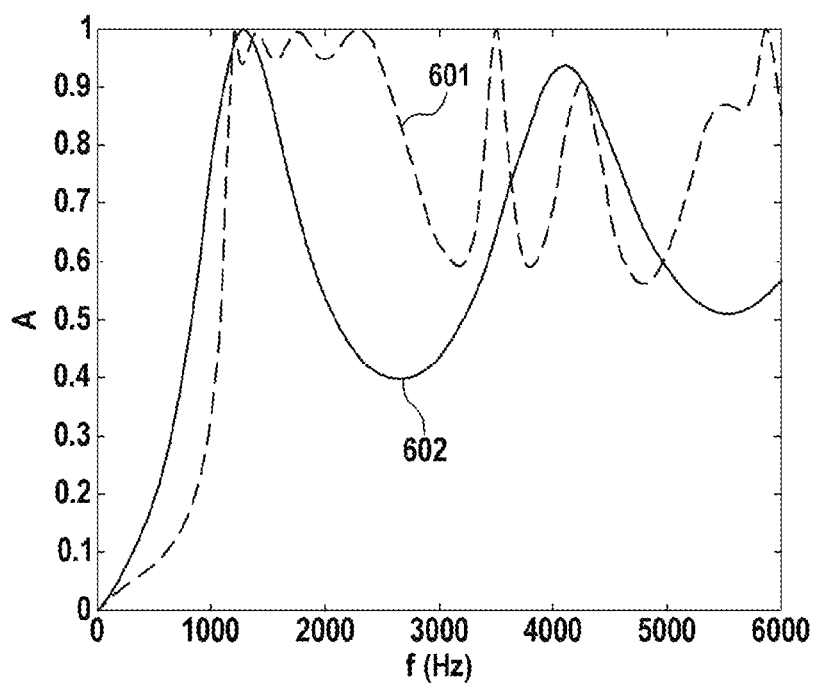
6B

ACOUSTIC TREATMENT COATING COMPRISING A FOLDED ORDERED METAPOROUS MATERIAL

CROSS-REFERENCE TO RELATED APPLICATIONS

This application is the U.S. National Stage of PCT/FR2021/051986, filed Nov. 9, 2021, which in turn claims priority to Canadian patent application number 3 099 284 filed Nov. 13, 2020. The content of these applications are incorporated herein by reference in their entireties.

TECHNICAL FIELD

The present invention relates to the general field of acoustic treatments for absorbing noise, and more particularly acoustic treatments comprising porous materials for absorbing noise.

PRIOR ART

Porous materials are used to absorb noise over wide ranges of acoustic frequencies in engines, and especially in aircraft fans. The low frequency limit for noise absorption of these porous materials is related to their thickness. This becomes rather constraining when low frequencies need to be absorbed. Moreover, significant noise absorption is only possible above the visco-inertial transition frequency of the porous material, which will then work in the inertial regime. This transition frequency depends on the microstructure of the porous material.

New engine architectures have fans rotating at low speeds, which reduces the acoustic frequencies of the spectrum to be attenuated. Indeed, a reduction in the speed of rotation of the fan implies a reduction in the blade passing frequency (BPF) of the fan, which is defined by $BPF_n = nB\Omega/60$, where n is the harmonic of the frequency BPF, B is the number of blades of the fan and $\Omega$ is the speed of rotation of the fan.

The minimum perfect absorption frequency is usually attained when the thickness of the porous material is approximately equal to a quarter of the acoustic wavelength. This has the direct consequence of requiring acoustic treatments based on porous materials that are much too voluminous and therefore incompatible with the available space in the thin nacelles of new generations of aircraft engines.

It is therefore desirable to have an acoustic treatment coating capable of absorbing low frequencies while remaining compact and relatively thin.

DISCLOSURE OF THE INVENTION

The invention relates to an acoustic treatment coating comprising a metamaterial, characterised in that the metamaterial comprises a solid structure comprising at least one free space forming a folded cavity and at least one porous material placed in said free space of the solid structure.

By using a solid structure in which at least one porous material is placed in a free space forming a folded cavity, defined for example by a helicoid shape, it is possible to increase the length of porous material within the coating. Hence, a sound wave passing through the coating of the invention travels an effective distance inside the porous material that is longer than the actual thickness of the coating. This effectively attenuates the acoustic frequencies. Hence, when for example the free space is defined by a helicoid shape, the higher the number of revolutions of the helicoid, the larger the effective distance and the more it is possible to obtain perfect absorption at a low frequency. Moreover, since the volume of the metamaterial is fixed, the area of porous material crossed by the sound wave is lower the higher the number of revolutions of the helicoid. This is manifested by finer and finer absorption peaks.

According to a particular feature of the invention, the folded cavity is defined by a helicoid.

According to another particular feature of the invention, the metamaterial is produced by additive manufacturing.

The advantage of using additive manufacturing in order to form the metamaterial, in particular the solid structure, is to be able to precisely adapt the geometry of the solid structure (number of free spaces, number of folded cavities, etc.) to the frequencies that it is desired to attenuate.

According to the particular features of the invention, the solid structure is produced from:
- a polymer material, for example thermoplastic materials PEEK (polyether ether ketone), or thermoplastic polyimides PEI (polyetherimide), which offer the advantage of extruding well and having improved properties (mechanical strength, fire resistance, temperature resistance, etc.); or
- a mixture of PEEK and PEI that can be reinforced by carbon fibres or ceramic fibres (made of silicon carbide, for example) in order to increase the mechanical performance of the structure; or
- a thermoplastic material, such as nylon, ABS or the polymer PLA, that may or may not be reinforced with fibres (carbon fibres, glass fibres or Kevlar fibres, for example) or even with powders in order to increase the strength of the structure; or
- a thermosetting material consisting of a polymer base and a cross-linking agent possibly including glass beads or even silica beads in order to improve the abrasion and erosion properties; or more broadly made of
- a titanium alloy metal material, such as Ti6A4IAV; or
- a metal material based on nickel-chromium alloy (Inco718), nickel-chromium-iron-molybdenum alloy (Hastelloy X) or even based on nickel alloy (Rene 77); or
- a ceramic-based metal material for increasing the resistance to heat and corrosion; or made of
- an aluminium alloy metal material.

More generally, the solid structure can be produced from any material that can be printed in three dimensions by the various known additive manufacturing processes.

According to an embodiment of the invention, each porous material comprises layers of filaments stacked one on top of the other.

The advantage of using such a porous material is to be able to precisely adjust the geometry of the porous material (diameter of the filaments, thickness between each layer, pore size, etc.) to the frequencies to be attenuated and hence to optimise the acoustic treatment. For example, the effective thickness of the porous material governs the peak absorption frequencies while the geometry of the pores influences these frequencies and governs the corresponding levels of absorption. For example, the smaller the diameter of the filament, the broader the absorption peaks and the smaller the pores, the higher the losses.

With additive manufacturing, it is also easy to adjust the geometry of the filaments and layers forming the porous material.

Additive manufacturing also makes it possible to produce the solid structure and the porous material simultaneously, which facilitates the placing of the porous material inside the free spaces of the solid structure.

According to a particular feature of the invention, each porous material is produced from foams or felts, or from stochastic materials or from any porous material for which the microstructure can be controlled.

According to another particular feature of the invention, the solid structure comprises between 2 and 6 free spaces, each free space forming a folded cavity. The folded cavity is, for example, defined by at least one helicoid.

A plurality of folded porous materials having different properties (effective thickness, structure of the porous material) can be assembled in parallel, either by using a plurality of free spaces of a solid structure, or by assembling a plurality of solid structures.

According to another particular feature of the invention, a cross-section of the solid structure is circular, triangular, hexagonal or rectangular.

According to another particular feature of the invention, a thickness of the metamaterial is between 5 mm and 500 mm. It is, for example, between 15 mm and 150 mm.

According to another particular feature of the invention, the folded cavities formed by the empty spaces of the solid structure are identical.

According to an embodiment of the invention, at least one folded cavity of the solid structure has a length different from the other cavities. This case is referred to as internal detuning. This can be produced, for example, by external detuning by assembling a plurality of solid structures having a different number of revolutions of the helicoids between the solid structures, if the folded cavities are defined by helicoids. They can also be produced by internal detuning, by assembling the same solid structure several times, but for which the folded cavities are interrupted before reaching the bottom of the treatment.

By having different dimensions between the folded cavities, it is then possible to have porous materials in the free spaces of different dimensions (effective thickness, structure of the porous material). By having different dimensions, it will be possible to target particular acoustic frequencies to be attenuated and thus to broaden the attenuation frequency band.

Another object of the invention is a turbomachine fan comprising an acoustic treatment coating according to the invention.

BRIEF DESCRIPTION OF THE FIGURES

Other features and advantages of the present invention will become apparent from the description given below, with reference to the appended drawings which illustrate exemplary embodiments that are in no way limiting.

FIG. 1 shows, schematically and partially, a section of turbomachine comprising an acoustic coating according to an embodiment of the invention.

FIG. 2A shows, schematically and partially, a perspective view of a metamaterial of the acoustic treatment coating, according to an embodiment of the invention.

FIG. 2B shows, schematically and partially, a perspective view of a metamaterial of the acoustic treatment coating, according to another embodiment of the invention.

FIG. 2C shows, schematically and partially, a perspective view of a metamaterial of the acoustic treatment coating, according to another embodiment of the invention.

FIG. 3 shows, schematically and partially, porous materials of the acoustic treatment coating according to a plurality of embodiments.

FIG. 4 shows the absorption as a function of acoustic frequency of an acoustic treatment coating comprising a metamaterial according to an embodiment of the invention and an acoustic treatment coating comprising only a straight (unfolded) porous material.

FIG. 5 shows the absorption as a function of the acoustic frequency of acoustic treatment coatings according to a plurality of embodiments of the invention.

FIG. 6 shows, schematically and partially, a porous material of the acoustic treatment coating according to an embodiment, as well as its absorption as a function of the acoustic frequency.

DESCRIPTION OF THE EMBODIMENTS

FIG. 1 shows, schematically and partially, a section of a turbomachine 100. The turbomachine 100 comprises a fan 120 and a thin nacelle 130. An acoustic treatment coating 110 according to an embodiment of the invention is present on a part of the nacelle 130.

The coating 110 can absorb low frequencies, for example between 1000 Hz and 2000 Hz, while having a relatively low thickness, the thickness of the metamaterial included in the coating being between 5 mm and 500 mm, and more particularly between 15 mm and 150 mm.

FIGS. 2A, 2B and 2C show, schematically and partially, a perspective view of a metamaterial of the acoustic coating according to a plurality of embodiments of the invention.

In FIG. 2A, the metamaterial 201 comprises a solid structure 210 and three free spaces 211, 212 and 213. Each free space 211, 212 and 213 is formed by helicoids with 0.75 revolution 241, 242 and 243. The metamaterial 201 has a hexagonal shaped cross-section, and the free spaces 211, 212 and 213 are identical.

In FIG. 2B, the metamaterial 202 comprises a solid structure 220 and six free spaces 221, 222, 223, 224, 225 and 226. Each free space 221 to 226 is formed by helicoids with one revolution. The metamaterial 202 has a hexagonal shaped cross-section, and the free spaces 221 to 226 formed by the helicoids are identical.

In FIG. 2C, the metamaterial 203 comprises a solid structure 230 and four free spaces 231, 232, 233 and 234. Each free space 231, 232, 233 and 234 is formed by helicoids with 0.75 revolution. The metamaterial 203 has a square-shaped cross-section, and the free spaces 231 to 234 are identical.

More generally, the number of revolutions of the helicoids forming the free spaces of the solid structure may vary between 0.1 and 100.

Each metamaterial 201, 202 and 203 also comprises a porous material placed in each free space 211 to 213, 221 to 226 and 231 to 234 of the metamaterials 201 to 203.

Whatever the embodiment, the solid structure can be made of:
- a polymer material, for example thermoplastic materials PEEK (polyether ether ketone), or thermoplastic polyimides PEI (polyetherimide), which offer the advantage of extruding well and having improved properties (mechanical strength, fire resistance, temperature resistance, etc.); or
- a mixture of PEEK and PEI that can be reinforced by carbon fibres or ceramic fibres (made of silicon carbide, for example) in order to increase the mechanical performance of the structure; or
- a thermoplastic material, such as nylon, ABS or the polymer PLA, that may or may not be reinforced with fibres (carbon fibres, glass fibres or Kevlar fibres, for example) or even with powders in order to increase the strength of the structure; or a thermosetting material consisting of a polymer base and a cross-linking agent possibly including glass beads or even silica beads in order to improve the abrasion and erosion properties; or more broadly made of a titanium alloy metal material, such as Ti6A4IAV; or a metal material based on nickel-chromium alloy (Inco718), nickel-chromium-iron-molybdenum alloy (Hastelloy X) or even based on nickel alloy (Rene 77); or a ceramic-based metal material for increasing the resistance to heat and corrosion; or made of an aluminium alloy metal material.

The material forming the solid structure can also be an abradable or porous material.

Whatever the embodiment, the solid structure can be produced by additive manufacturing. This makes it possible to easily adjust the dimensions of the solid structure, for example the shape of the cross-section of the structure and of the free spaces, the number of free spaces, or even the number of folded cavities, to the desired performance of the acoustic treatment.

Whatever the embodiment, the porous material comprised in the metamaterials can comprise layers of filaments stacked one on top of the other.

Whatever the embodiment, the porous material can also be a foam or a felt, or a stochastic (cellular) material or any other porous material for which the microstructure can be controlled. For example, it can be a porous material consisting of micro-channels, or a porous fibrous material, or a porous cellular material, such as a foam with connected pores, or even a porous granular material, such as a powder.

FIG. 3 shows examples of porous materials 301, 302, 303 and 304 comprising layers of filaments according to a plurality of embodiments of the invention.

The porous material 301 comprises filaments 311 to 317 forming two layers stacked one on top of the other. The filaments 311 to 317 have a circular cross-section. The angle formed between two filaments of two adjacent layers, for example between the filaments 311 and 317, is 90°.

The porous material 302 comprises filaments 321 to 327 forming two layers stacked one on top of the other. The filaments 321 to 327 have a square cross-section. The angle formed between two filaments of two adjacent layers, for example between the filaments 321 and 327, is 90°.

The porous material 303 comprises filaments 331 to 337 forming two layers stacked one on top of the other. The filaments 331 to 337 have a triangular cross-section. The angle α formed between two filaments from two adjacent layers, for example between the filaments 333 and 337, is greater than 90°.

The porous material 304 comprises filaments 341 to 352 forming three layers stacked one on top of the other. The filaments 341 to 352 are arranged in pairs and have a circular cross-section. The angle α formed between two pairs of filaments from two adjacent layers, for example between the pair of filaments 341, 342 and the pair of filaments 343, 344, is 90°.

More generally, the filaments forming the stacked layers of the porous material can have a cross-section that is triangular, hexagonal, rectangular, square, circular, star-shaped or any shape whatsoever.

Moreover, the diameter or a characteristic length of the filaments can vary between 1 μm and 2000 μm.

A spacing L between the filaments can vary between 1 μm and 10 mm.

The height of the porous material, in other words the stack of the layers of filaments, can vary between 5 mm and 50 cm. Typically, the height between the layers of filaments forming the porous material can vary between 0.1 and 100 times the diameter of the filament.

The angle α formed between two filaments of two adjacent layers can vary between and 180°.

Whatever the embodiment, the layers of filaments can be produced by additive manufacturing. This makes it possible, in particular, to precisely adjust the dimensions of the filaments and of the layers of the porous material to the frequency ranges that it is desired to absorb and to the desired performance of the acoustic treatment. Furthermore, the layers of filaments of the porous material and the solid structure can be produced simultaneously using additive manufacturing.

FIG. 4 shows the absorption A at normal incidence as a function of the acoustic frequency f of an acoustic treatment coating comprising a metamaterial according to an embodiment of the invention and an acoustic treatment coating comprising only a porous material. The metamaterial according to the invention is composed of the single type of porous folded material; there is no detuning. The acoustic frequency f is expressed in Hertz and varies between 0 and 6000 Hz.

The curve 401 represents the absorption A of a coating comprising only one straight homogeneous porous material. There is therefore no folded cavity. This porous material comprises layers of filaments stacked one on top of the other. The diameter D of the filaments is 200 μm. The spacing L between the centre of the filaments is 670 μm. The thickness of the coating is 30 mm.

The curve 402 represents the absorption A of the coating according to an embodiment of the invention. The metamaterial of the invention comprises a porous material comprising layers of filaments stacked one on top of the other. The diameter D of the filaments is 200 μm and the spacing L between the centre the filaments is 400 μm. The helicoids forming the free spaces of the solid structure have a number of revolutions of 1. The metamaterial has a thickness of 30 mm.

Comparison of curves 401 and 402 shows that the coating according to the invention can indeed absorb lower frequencies than a conventional coating comprising only a straight homogeneous porous material. This comparison also shows that the coating according to the invention causes the absorption peaks to be finer.

FIG. 5 shows the absorption A as a function of the acoustic frequency f for two acoustic treatment coatings according to embodiments of the invention. The acoustic frequency f is expressed in Hertz and varies between 0 and 6000 Hz.

The curve 501 shows the absorption A of a coating of the invention, in which the porous material comprises layers of filaments stacked one on top of the other, the filaments having a diameter of 400 μm. The free spaces of the metamaterial of the coating are formed by helicoids having 1 revolution. The spacing between the filaments is 670 μm.

The curve 502 shows the absorption A of a coating of the invention, in which the porous material comprises layers of filaments stacked one on top of the other, the filaments having a diameter of 200 μm. The free spaces of the metamaterial of the coating are formed by helicoids having 1 revolution. The spacing between the filaments is 1000 μm.

For each of curves 501 and 502, the coating has a thickness of 30 mm.

The comparison of the two curves 501 and 502 shows that by reducing the diameter of the filaments while keeping the number of revolutions of the helicoids constant, it is possible to broaden the absorption peaks around local maxima.

According to another embodiment, the free spaces of the metamaterial according to the invention can also have different dimensions. For this, it is possible, for example, to vary the length of the helicoids forming the free spaces. By combining a plurality of lengths of folded cavities, the absorption peaks at neighbouring frequencies are combined and a coating capable of effectively absorbing noise (absorption A close to 1) is thus obtained over a wide frequency range. The porous material comprised in each of these free spaces is also suitable for adjusting its losses and can attenuate the targeted frequencies. The coating therefore comprises free spaces that are each tuned to a particular frequency.

FIG. 6 shows an example of this type of coating (FIG. 6A) as well as the absorption A of this coating as a function of acoustic frequency f (curve 601, FIG. 6B). The metamaterial 600 of the coating comprises 4 solid structures 610, 620, 630 and 640. Each of the solid structures 610, 620, 630 and 640 comprises folded cavities having a different number of revolutions. The filaments forming the porous materials present in the folded cavities have a thickness of 200 μm.

The absorption A of this coating 600 (curve 601) is compared with the absorption A of a coating comprising only a single solid structure (602). The two coatings have a thickness of 30 mm. In the coating comprising only a single solid structure, the spacing between the filaments is 670 μm and their thickness is 200 μm. The folded cavity of this coating has 1 revolution.

By comparing curves 601 and 602, it is clearly observed that the coating with the metamaterial 600 has an absorption A close to 1 over a wide frequency range between 100 Hz and 2500 Hz, while the coating with a single solid structure has an the absorption peak A of 1, only at 100 Hz.

The expression "between . . . and . . . " should be understood as including the limits.

The invention claimed is:

1. An acoustic treatment coating comprising a metamaterial, wherein the metamaterial comprises a solid structure comprising at least one free space forming a folded cavity and at least one porous material placed in said free space of the solid structure, wherein each porous material comprises layers of filaments stacked one on top of the other and wherein a spacing between the filaments of a layer varies between 1 μm and 10 mm.

2. The acoustic treatment coating according to claim 1, wherein the folded cavity is defined by a helicoid.

3. The acoustic treatment coating according to claim 1, wherein the metamaterial is produced by additive manufacturing.

4. The acoustic treatment coating according to claim 1, wherein the solid structure comprises between 2 and 6 free spaces, each free space forming a folded cavity.

5. The acoustic treatment coating according to claim 1, wherein a cross-section of the solid structure is circular, triangular, hexagonal or rectangular.

6. The acoustic treatment coating according to claim 1, wherein a thickness of the metamaterial is between 5 mm and 500 mm.

7. The acoustic treatment coating according to claim 1, wherein the folded cavities formed by the free spaces of the solid structure are identical.

8. The acoustic treatment coating according to claim 1, wherein at least one folded cavity of the solid structure has a length different from the other folded cavities.

9. A turbomachine fan comprising an acoustic treatment coating according to claim 1.

* * * * *